E. DAYTON.
Hose-Coupling.
No. 164,816. 
Patented June 22, 1875.
Witnesses.
Edw. C. Earle
Jos. C. Earle
Edwin Dayton
Inventor
By Atty.
John E. Earle

UNITED STATES PATENT OFFICE.

EDWIN DAYTON, OF MERIDEN, CONNECTICUT.

IMPROVEMENT IN HOSE-COUPLINGS.

Specification forming part of Letters Patent No. 164,816, dated June 22, 1875; application filed March 9, 1875.

*To all whom it may concern:*

Be it known that I, EDWIN DAYTON, of Meriden, in the county of New Haven and State of Connecticut, have invented a new Hose-Coupling; and I do hereby declare the following, when taken in connection with the accompanying drawings and the letters of reference marked thereon, to be a full, clear, and exact description of the same, and which said drawings constitute part of this specification, and represent a longitudinal section as applied to a section of hose.

This invention relates to an improvement in the construction and attachment of couplings to hose; and it consists in constructing the parts of the coupling with a hollow externally-threaded plug to enter the end of a section of hose, and with a flange to pass over the said end, combined with an internally-threaded socket of larger external diameter than the internal diameter of the hose, inserted into the hose, then the plug screwed into said socket to draw said flange onto the hose, to clamp the hose between said socket and flange, as more fully hereinafter described.

A is the male and B the female part of the coupling, the part B swiveled in the usual manner; C, the plug, formed upon or attached to the part of the coupling proper. The external diameter of the plug is substantially that of the interior of the hose to be coupled, and on the interior a screw-thread is formed—the interior made as large as may be consistent with the strength required. On this plug, or attached thereto, is a flange, D, forming an annular space, *d*, around the plug, the internal diameter of the flange substantially that of the exterior of the hose, so that as the plug passes into the end of the hose, the flange will pass over the outside. E is the socket, its external diameter greater than the internal diameter of the hose, and preferably of less diameter at one end than at the other. This socket is threaded upon its inside to correspond to the thread on the plug. The socket E is inserted into one end of the hose a short distance from the end, as seen at the left hand in the drawing, then the plug is screwed into the socket, the flange D passing over the end of the hose, as seen at the right hand in the drawing, until the hose is firmly clamped between the flange and socket, as shown. This secures the coupling to the hose in the most perfect manner.

I claim—

The hollow-threaded plug C, formed upon or attached to the respective parts of the coupling, and the flange D on said plug combined with the socket E, substantially as described.

EDWIN DAYTON.

Witnesses:
GEORGE W. SMITH,
CARRIE A. DAYTON.